(No Model.) 2 Sheets—Sheet 1.

G. H. SMITH.
SALT EVAPORATING PAN.

No. 287,183. Patented Oct. 23, 1883.

Attest,
N. A. Clark
W. H. Bartlett.

Inventor,
George H Smith
By J H Warwick
Atty (No Model.)  
2 Sheets—Sheet 2.
G. H. SMITH.
SALT EVAPORATING PAN.
No. 287,183. Patented Oct. 23, 1883.
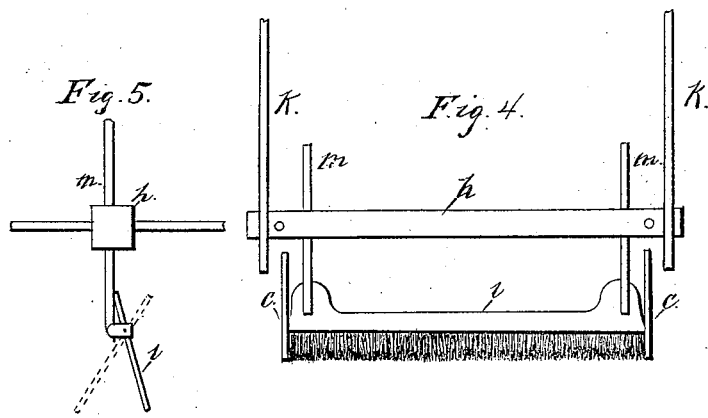
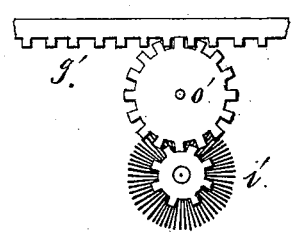
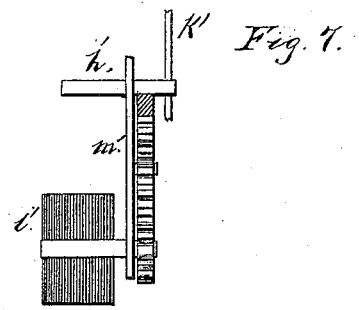
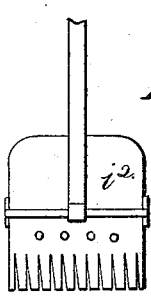
Attest:  
N. A. Clark  
W. H. Bartlett
Inventor  
George H. Smith  
By J. H. Warwick  
Atty

UNITED STATES PATENT OFFICE.

GEORGE H. SMITH, OF NEW YORK, N. Y.

SALT-EVAPORATING PAN.

SPECIFICATION forming part of Letters Patent No. 287,183, dated October 23, 1883.

Application filed March 23, 1883. (No model.)

*To all whom it may concern:*

Be it known that I, GEORGE H. SMITH, a citizen of the United States, residing at New York, in the county of New York and State of New York, have invented certain new and useful Improvements in Salt-Evaporating Pans, of which the following is a specification, reference being had therein to the accompanying drawings.

My invention relates to improvements in salt-evaporating pans; and it consists in the construction and combination of parts hereinafter set forth. The novel features are pointed out in the claims hereto annexed.

The object of my invention is to construct an evaporating-pan and mechanical appliances which will convey the salt therefrom without the necessity of using hand-hoes or scrapers.

Figure 1:
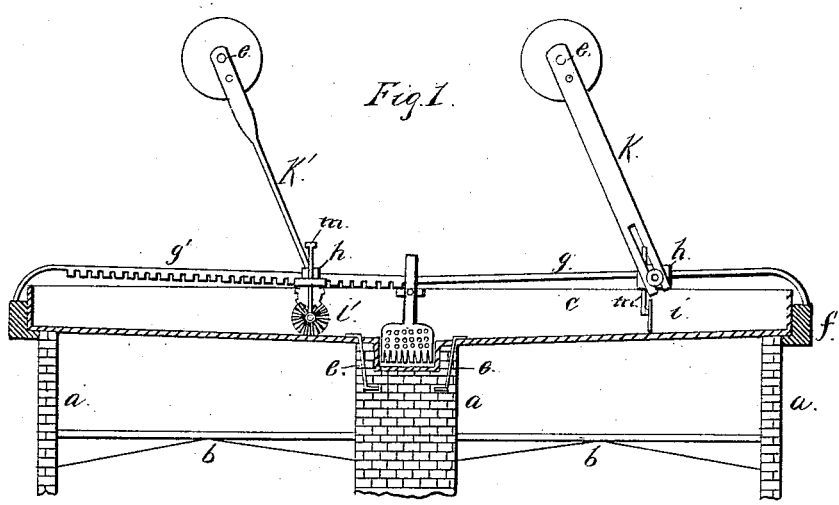
Figure 2:
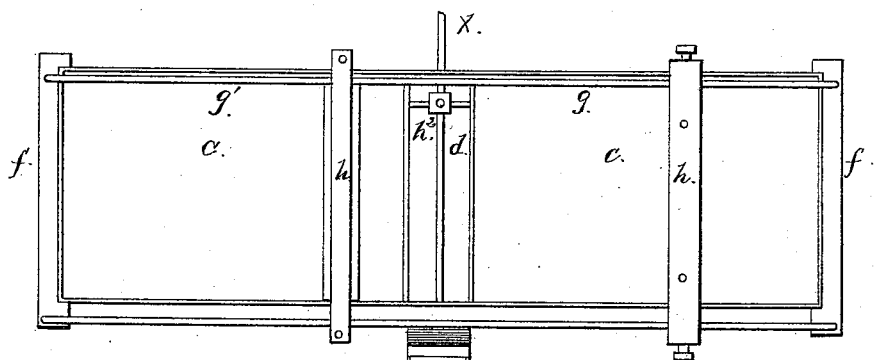
Figure 3:
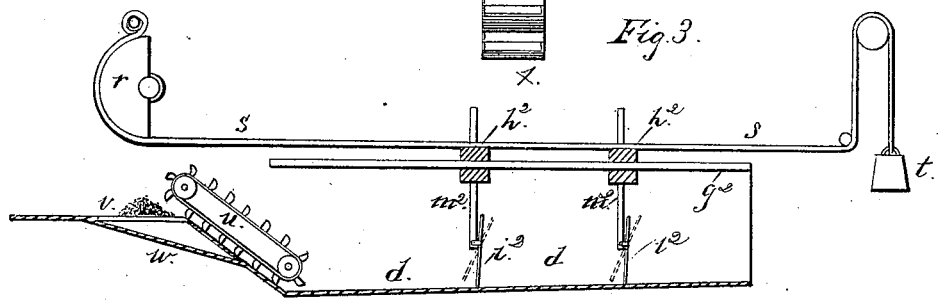

In the accompanying drawings, which form a part of this specification, Figure 1 is a longitudinal section of the salt-pan, showing hoes and brooms in position. Fig. 2 is a plan view. Fig. 3 is a section on line $x$ $x$, Fig. 2, showing additional details. Figs. 4 and 5 are details showing brooms or hoes and mode of feathering the same. Figs. 6 and 7 show rotary broom and mode of operating same. Fig. 8 is a view of the hoe which operates in the trough.

My evaporating-pan is made of sheet metal in the usual manner, and rests upon supports of brick-work or suitable material, designated by the letter $a$ in the drawings. Grate-bars, as $b$, may form the fire-place.

The pan $c$ has inclined bottom, and at some part of the pan, either in the middle or at either side, there is a trough, $d$, which is deeper than the pan proper. The bottom of the pan inclines slightly toward this trough. The trough of the pan is in that portion which rests on the brick-work, so that it is protected from the direct heat of the flames, and the pan is held at this part by anchoring-rods extending into the brick-work, as at $e$ $e$.

The ends of the pan are supported by strong timbers $f$ $f$, which are outside the brick-work and away from the fire. To these timbers or to any other suitable supports guide-rods $g$ are attached. These rods are preferably parallel with the bottom of the pan; but it is not absolutely essential that they should be so. The rods or bars $g$ may have cogged teeth on one side, preferably the under side, as at $g'$, for a purpose hereinafter stated.

Carriers or conveyers $h$ for the hoes and brooms are guided on these bars $g$ $g'$. These carriers have brooms $i$ or $i'$ attached to them, and they are moved back and forth along the guide-bars by pitmen $k$ $k'$, extending from oscillating shafts overhead, as at $l$ $l$. The pitmen, or more properly crank-arms, are slotted at the ends, as at $k$, or may be reduced in size and pass through holes in the carriers $h$, as shown at $k'$. In either case the oscillating motion of the shafts $l$ produces a reciprocating motion of the carriers $h$ along the guide-bars.

It is obviously immaterial how the reciprocation of the carriers $h$ is obtained. The shafts $l$ may rotate and cause the arms $k$ $k$ to swing back and forth by means of a cranked connection, in manner well understood by mechanics.

The brooms $i$ $i$ are carried on rods $m$, extending through or connected to the carriers $h$. If these rods extend through the carriers, they may be allowed a limited vertical play therein to compensate for slight inequalities in the bottom of the pan.

The brooms $i$ may be made of withes or osiers, or of wire or sheet metal which will spring and allow for slight inequalities in the bottom of the pan, and will readily pass over the seams and rivets. The brooms $i$ are pivoted to rods $m$, as clearly shown in Fig. 5, so that in moving forward the brooms will be held in a vertical position, but in passing back the brooms will be "feathered" or swung into the position shown in dotted lines, and will not sweep in this direction.

The rotary broom $i'$ is to be used occasionally when it is found necessary to thoroughly scour the bottom of the pan. This broom is made to revolve by means of a pinion, as $o'$, carried on rods $m'$, which pinion meshes with the rack on bar $g'$, and with a pinion on the end of the broom $i'$. More than one intermediate pinion may be used between the rack $g'$ and the broom $i'$, according to the direction of rotation desired to be given to the rotating broom, or a bevel-gear and shaft connections be substituted for the pinion $o'$ when found desirable.

The revolving broom operates in the manner well known in carpet-sweepers and street-sweeping machines. Its pinion may engage directly with the rack, without intermediates, when this gives the proper direction. The direction of rotation depends on the relative location of broom and trough.

The hoes $i^2$ operate in the trough $d$ in the pan at right angles to the path of movement of the hoes $i\ i'$. These hoes are preferably of sheet metal, with broad teeth something like comb-teeth, which will spring over slight inequalities in the bottom of the pan, and are perforated, if of large surface area, to permit the passage of the brine.

The hoes $i^2$ are pivoted to rods $m^2$, and these rods $m^2$ have a vertical play in the carriers $h^2$, which run on the guide-bar $g^2$, and may be drawn forward by a belt, $s$, which is connected to carriers $h^2$, and drawn in one direction by the rotation of a rotating segment, as $r$, and drawn back by a weight, $t$. Other means of reciprocating the hoes $i^2$ in the trough may be employed, as with brooms $h$.

At the end of trough $d$ there should be an endless-belt carrier or elevator, operated from any suitable source of power, and this elevator $u$ conveys the salt from the bottom of the pan and piles it on grating or screen $v$, where the drainage is permitted to escape back into the pan down the incline $w$, which opens into the pan.

The operation of my device is as follows: The pan having been nearly filled with brine, which is heated by the furnace beneath, the reciprocating brooms, hoes, and elevator are put at work. The brooms sweep the salt, as fast as it forms, toward and into the trough $d$. This trough, being protected from the intense heat of the rest of the pan, contains the salt for some little time, if necessary, without injury by burning. The brooms $i$ feather on their return-stroke, and pass over the salt at the bottom of the pan. The hoes $i^2$ convey the salt along the trough until it is taken up by the elevator or removed by other suitable means.

What I claim is—

1. A salt-evaporating pan having in its bottom an open-topped trough depressed below the general level of the bottom of the pan, and protected by the masonry from the action of the flames, in combination with reciprocating brooms or scrapers, made to operate in the trough by suitable mechanism, substantially as described.

2. The pan with inclined bottom and trough, as described, the rack guide-bar parallel with the bottom of the trough, the carrier, rotating broom, and intermediate driving mechanism, all arranged and operating in combination, substantially as described.

3. The salt-pan, the racked guide-bar, reciprocating carrier, and revolving broom, all combined to operate substantially as stated.

4. The pan having a trough or depression protected from the direct operation of the flames, as set forth, combined with reciprocating hoes operating in said trough, substantially in the manner stated.

5. The pan with trough protected, as described, in combination with reciprocating hoes operating in said trough, the hoes being pivoted and attached to the carrier, as described, so as to move the salt in one direction, but to feather and pass over it in the other direction, as set forth.

6. The pan with inclined bottom and central protected trough, the reciprocating brooms at each end, operated by mechanism, substantially as described, to sweep the salt into the trough, the reciprocating hoes in the trough, to convey the salt to one side of the pan, all operating in combination, substantially as hereinbefore set forth.

In testimony whereof I affix my signature in presence of two witnesses.

GEORGE H. SMITH.

Witnesses:
H. A. METCALF,
F. J. HUMPHREY.